United States Patent [19]

DeBoer et al.

[11] Patent Number: 4,965,242
[45] Date of Patent: Oct. 23, 1990

[54] METHOD OF MAKING COLOR FILTER ARRAY FOR LIQUID CRYSTAL DISPLAY

[75] Inventors: Charles D. DeBoer, Rochester; Richard T. Klingbiel, Webster, both of N.Y.

[73] Assignee: Eastman Kodak Company, Rochester, N.Y.

[21] Appl. No.: 449,623

[22] Filed: Dec. 11, 1989

[51] Int. Cl.⁵ .............................................. B41M 5/35
[52] U.S. Cl. ....................................... 503/227; 8/471; 156/235; 156/277; 350/311; 428/1; 428/195; 428/913; 428/914; 430/7; 430/200; 430/201; 430/945
[58] Field of Search ..................... 8/471; 156/235, 277; 350/311; 428/1, 195, 913, 914; 430/7, 200, 201, 945; 503/227

[56] References Cited

U.S. PATENT DOCUMENTS 4,081,277 3/1978 Brault et al. ........................ 96/38.2
4,786,148 11/1988 Sakimura et al. .............. 350/339 F

FOREIGN PATENT DOCUMENTS 2083726 3/1982 United Kingdom ................ 503/227

*Primary Examiner*—Bruce H. Hess
*Attorney, Agent, or Firm*—Harold E. Cole

[57] ABSTRACT

A process of preparing a color filter array element for use in making a color liquid crystal display device comprising:
(a) overlaying a dye-receiving element with a dye-donor element, the dye-receiving element comprising a dimensionally-stable temporary support having thereon, in order, a polymeric alignment layer, a transparent conducting layer and a dye-receiving layer;
(b) imagewise heating the dye-donor element to transfer a dye image in a repeating mosaic pattern to the dye-receiving layer;
(c) removing the dye-donor element from contact with the dye-receiving element;
(d) laminating a transparent permanent support to the dye-receiving layer containing the dye image in a repeating mosaic pattern; and
(e) removing the temporary support to expose one surface of the polymeric alignment layer, thereby forming the color filter array element.

10 Claims, 1 Drawing Sheet

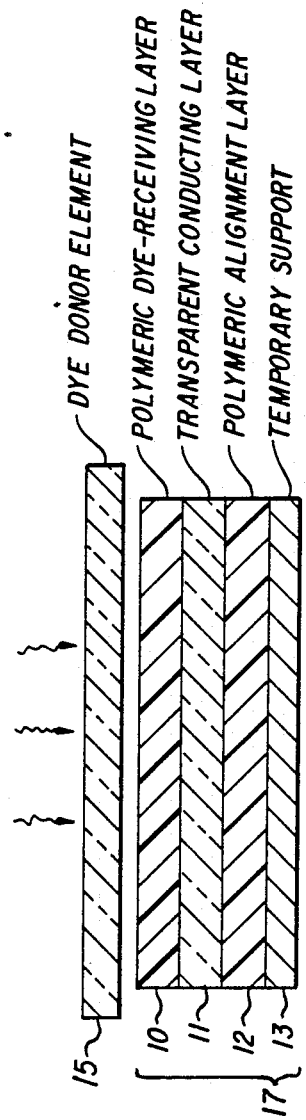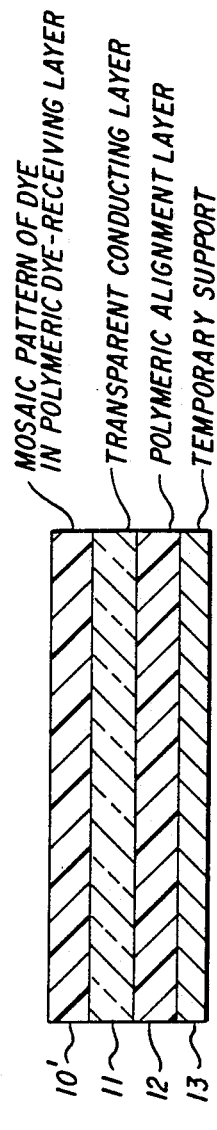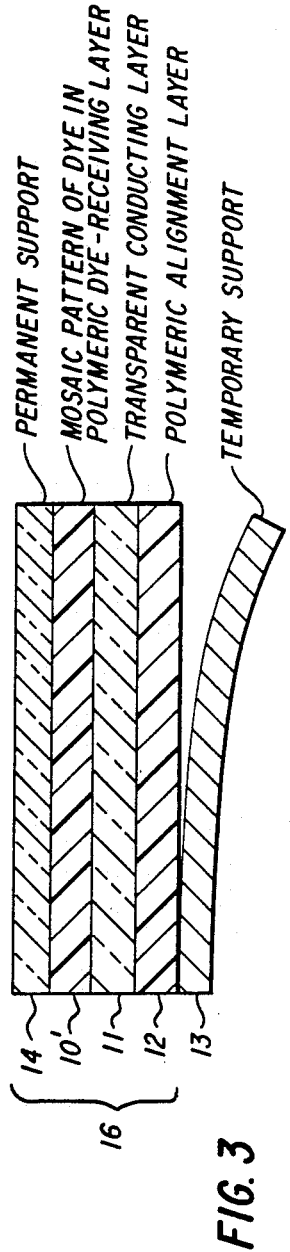

METHOD OF MAKING COLOR FILTER ARRAY FOR LIQUID CRYSTAL DISPLAY

This invention relates to a method for making color filter array elements used in making liquid crystal display devices by employing a temporary support which is stripped off during the process.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye donor element is placed face-to-face with a dye receiving element. The two are then inserted between a thermal printing head and a platen roller. A line-type thermal printing head is used to apply heat from the back of the dye donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB No. 2,083,726A, the disclosure of which is hereby incorporated by reference.

Liquid crystal display devices are known for digital display in electronic calculators, clocks, household appliances, audio equipment, etc. There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users' needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor-intensive steps, requires careful alignment, is time consuming and very costly. Further details of this process are disclosed in U.S. Pat. No. 4,081,277. U.S. Pat. No. 4,786,148 also discloses a color filter array element which employs certain pigments.

In addition, a color filter array element to be used in a liquid crystal display device may have to undergo rather severe heating and treatment steps during manufacture. For example, a transparent conducting layer, such as indium tin oxide, is usually vacuum sputtered onto the color filter array element and then cured. This may take place at temperatures elevated as high as 200° C. for times which may be as long as one hour or more. This is followed by coating with a thin polymeric alignment layer for the liquid crystals, such as a polyimide. Regardless of the alignment layer used, the surface finish of this layer in contact with the liquid crystals is very important and may require rubbing or may require curing for up to several hours at an elevated temperature. These treatment steps can be very harmful to many color filter array elements, especially those with a gelatin matrix.

It would be desirable to provide a high quality color filter array element having good sharpness and which can be obtained easily and at a lower price than those of the prior art. It would also be desirable to provide such a color filter array element which will be able to withstand the heating and treatment steps employed in making a liquid crystal display device.

These and other objects are achieved in accordance with this invention which comprises a process of preparing a color filter array element for use in making a color liquid crystal display device comprising:

(a) overlaying a dye receiving element with a dye donor element, the dye receiving element comprising a dimensionally stable temporary support having thereon, in order, a polymeric alignment layer, a transparent conducting layer and a dye-receiving layer;

(b) imagewise heating the dye-donor element to transfer a dye image in a repeating mosaic pattern to the dye-receiving layer;

(c) removing the dye donor element from contact with the dye receiving element;

(d) laminating a transparent permanent support to the dye receiving layer containing the dye image in a repeating mosaic pattern; and (e) removing the temporary support to expose one surface of the polymeric alignment layer, thereby forming the color filter array element.

As shown in FIG. 1, a dye-donor element 15 is placed over the dye-receiving element 17 comprising temporary support 13 having thereon a polymeric alignment layer 12, transparent conducting layer 11 and polymeric dye-receiving layer 10. Heat is then applied to the donor by radiant energy means such as a laser, resistive head, high intensity flash, etc., through a mask to obtain a mosaic pattern of dye in the dye-receiving layer 10', as shown in FIG. 2. The dye donor is then removed and a permanent support 14, such as glass, is then affixed to the receiving layer containing the mosaic pattern as shown in FIG. 3. The temporary support 13 is then removed to obtain the color filter array element 16.

The temporary support used in the invention may be a metal foil such as a thin stainless steel or a polymeric material such as poly(ethylene terephthalate) or a polymeric diimide material.

The permanent support employed in the invention can be any transparent material such as a polycarbonate, polyethylene terephthalate, cellulose acetate, polystyrene, etc. In a preferred embodiment the permanent support is glass.

In another preferred embodiment of the invention, the mosaic pattern consists of a set of red, green and blue additive primaries.

In yet another preferred embodiment of the invention, each area of primary color and each set of primary colors are separated from each other by an opaque area, e.g. black grid lines. This has been found to give improved color reproduction and reduce flare in the displayed image.

The size of the mosaic set is not critical since it depends on the viewing distance. In general, the individual pixels (mosaic elements) of the set are from about 50 to about 600 μm and do not have to be of the same size.

In a preferred embodiment of the invention, the repeating mosaic pattern of dye to form the color filter array element consists of uniform, square, linear repeating areas, with one color diagonal displacement as follows:

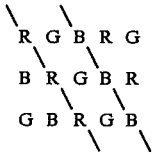

In another preferred embodiment, the above squares are approximately 100 μm.

As noted above, the color filter array elements of the invention are used in various display devices such as a liquid crystal display device. Such liquid crystal display devices are described, for example, in UK Pat. Nos. 2,154,355; 2,130,781; 2,162,674 and 2,161,971.

Liquid crystal display devices are commonly made by placing a material, which is liquid crystalline at the operating temperature of the device, between two transparent electrodes, usually indium tin oxide coated on glass, and exciting the device by applying a voltage across the electrodes. An alignment layer is usually coated over the transparent electrode layer and is treated to provide grooves so that the liquid crystal molecules will lay down in one direction. By mounting the opposing glass plates with the axes of the treated surfaces being at 90° angles, the liquid crystal material will align itself in a twisted path through a 90° angle between the surfaces. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell which are parallel to the grooved direction, polarized light can be passed through the cell or extinguished, depending on whether or not an electric field is applied.

The polymeric alignment layer used in the invention may be any of the materials commonly used in the liquid crystal art. Such materials include polyimides, polyvinyl alcohol, methyl cellulose, etc.

The transparent conducting layer used in the invention is also conventional in the liquid crystal art. Such materials include indium tin oxide, indium oxide, tin oxide, cadmium stannate, etc.

The dye image receiving layer used in forming the color filter array element of the invention may comprise, for example, polymers such as a polycarbonate, a polyurethane, a polyester, a polyvinyl chloride, a polyamide, a polystyrene, an acrylonitrile, a polycaprolactone or mixtures thereof. This layer may be present in any amount which is effective for the intended purpose. In general, good results have been obtained at a coverage of from about 0.25 to about 5 g/m$^2$. In a preferred embodiment, polycarbonates have a $T_g$ greater than about 200° C. as disclosed in U.S. patent application Ser. No. 334,269, filed Apr. 6, 1989 of Harrison et al are employed.

A dye donor element that is used to form the color filter array element of the invention comprises a support having thereon a dye layer. Any dye or mixture of dyes can be used in such a layer provided they are transferable to the dye image-receiving layer of the color array element of the invention by the action of heat. Especially good results have been obtained with sublimable dyes. Examples of sublimable dyes include anthraquinone dyes, e.g., Sumikalon Violet RS ® (Sumitomo Chemical Co., Ltd.), Dianix Fast Violet 3R FS ® (Mitsubishi Chemical Industries, Ltd.), and Kayalon Polyol Brilliant Blue N-BGM ® and KST Black 146 ® (Nippon Kayaku Co., Ltd.); azo dyes such as Kayalon Polyol Brilliant Blue BM ®, Kayalon Polyol Dark Blue 2BM ®, and KST Black KR ® (Nippon Kayaku Co., Ltd.), Sumickaron Diazo Black 5G ® (Sumitomo Chemical Co., Ltd.), and Miktazol Black 5GH ® (Mitsui Toatsu Chemicals, Inc.); direct dyes such as Direct Dark Green B ® (Mitsubishi Chemical Industries, Ltd.) and Direct Brown M ® and Direct Fast Black D ® (Nippon Kayaku Co. Ltd.); acid dyes such as Kayanol Milling Cyanine 5R ® (Nippon Kayaku Co. Ltd.); basic dyes such as Sumicacryl Blue 6G ® (Sumitomo Chemical Co., Ltd.), and Aizen Malachite Green ® (Hodogaya Chemical Co., Ltd.);

-continued

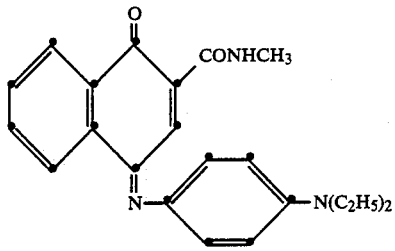
(cyan)

or any of the dyes disclosed in U.S. Pat. Nos. 4,541,830, 4,541,830, 4,698,651, 4,695,287; 4,701,439, 4,757,046, 4,743,582, 4,769,360 and 4,753,922, the disclosures of which are hereby incorporated by reference. The above subtractive dyes may be employed in various combinations to obtain the desired red, blue and green additive primary colors. The dyes may be mixed within the dye layer or transferred sequentially if coated in separate dye layers. The dyes may be used at a coverage of from about 0.05 to about 1 g/m².

The dye donor element employed in the invention may be used in sheet form or in a continuous roll or ribbon. If a continuous roll or ribbon is employed, it may have only one dye or may have alternating areas of other different dyes, such as sublimable cyan and/or magenta and/or yellow and/or black or other dyes as described above.

The dye in the dye donor element is preferably dispersed in a polymeric binder such as a cellulose derivative, e.g., cellulose acetate hydrogen phthalate, cellulose acetate, cellulose acetate propionate, cellulose acetate butyrate, cellulose triacetate; a polycarbonate; a poly(styrene-co-acrylonitrile), a poly(sulfone) or a poly(phenylene oxide). The binder may be used at a coverage of from about 0.1 to about 5 g/m².

The dye layer of the dye donor element may be coated on the support or printed thereon by a printing technique such as a gravure process.

Any material can be used as the support for the dye donor element provided it is dimensionally stable and can withstand the heat of the thermal printing process. Such materials include polyesters such as poly(ethylene terephthalate); polyamides; polycarbonates; glassine paper; condenser paper; cellulose esters; fluorine polymers; polyethers; polyacetals; polyolefins; and polyimides. The support generally has a thickness of from about 2 to about 30 μm. It may also be coated with a subbing layer, if desired.

Various methods my be used to transfer dye from the dye donor to the transparent support to form the color filter array element of the invention. There may be used, for example, a high intensity light flash technique with a dye-donor containing an energy absorptive material such as carbon black or a light-absorbing dye. Such a donor may used in conjunction with a mirror which has a grid pattern formed by etching with a photoresist material. This method is described more fully in U.S. patent application Ser. No. 408,581 by Simons entitled "Method of Making a Color Filter Array Using Light Flash", filed Sept. 18, 1989.

Another method of transferring dye from the dye donor to the transparent support to form the color filter array element of the invention is to use a heated embossed roller as described more fully in U.S. patent application Ser. No. 408,580 by Simons entitled "Method of Making a Color Filter Array Using a Heated Embossed Surface", filed Sept. 18, 1989.

In a preferred embodiment of the invention, the imagewise-heating is done by means of a laser using a dye-donor element comprising a support having thereon a dye layer and an absorbing material for the laser, said imagewise-heating being done in such a way as to produce a repeating mosaic pattern of colorants.

Any material that absorbs the laser energy may be used as the absorbing material described above for the laser such as carbon black or non-volatile infrared-absorbing dyes or pigments which are well known to those skilled in the art. Cyanine infrared absorbing dyes may also be employed with infrared diode lasers as described in DeBoer application Ser. No. 363,836 filed June 9, 1989, the disclosure of which is hereby incorporated by reference.

Several different kinds of lasers could conceivably be used to effect the thermal transfer of dye from a donor sheet to the dye receiving element to form the color filter array element, such as ion gas lasers like argon and krypton; metal vapor lasers such as copper, gold, and cadmium; solid-state lasers such as ruby or YAG; or diode lasers such as gallium arsenide emitting in the infrared region from 750 to 870 nm. However, in practice, the diode lasers offer substantial advantages in terms of their small size, low cost, stability, reliability, ruggedness, and ease of modulation. In practice, before any laser can be used to heat a dye donor element, the laser radiation must be absorbed into the dye layer and converted to heat by a molecular process known as internal conversion. Thus, the construction of a useful dye layer will depend not only on the hue, sublimability and intensity of the image dye, but also on the ability of the dye layer to absorb the radiation and convert it to heat.

Lasers which can be used to transfer dye from the dye donor element to the dye image-receiving element to form the color filter array element of the invention are available commercially. There can be employed, for example, Laser Model SDL 2420H2 ® from Spectra Diode Labs, or Laser Model SLD 304 V/W ® from Sony Corp.

After the dyes are transferred to the receiver, the image may be treated to further diffuse the dye into the dye-receiving layer in order to stabilize the image. This may be done by radiant heating, solvent vapor, or by contact with heated rollers. The fusing step aids in preventing fading and surface abrasion of the image upon exposure to light and also tends to prevent crystallization of the dyes. Solvent vapor fusing may also be used instead of thermal fusing.

The following example is provided to illustrate the invention.

EXAMPLE 1

On top of an unsubbed 75 μm thick duPont Kapton ® support (a polymer of the diimide of pyromellitic acid and 4,4'oxydianiline), a layer of Probimide 412 ® (Ciba-Geigy, described as a photoimageable preimidized polymer that may be related to the diimide of 3,3'-4,4'-benzophenone tetracarbocyclic acid and a dialkyl-p-phenylene-diamine) (0.54 g/m²) was coated from methylene chloride. The polymeric diimide as supplied by the manufacturer is in a γ-butyrolactone solvent which is not suitable for coating because of its high boiling point. Thus, the polymer was precipitated from methanol, isolated by filtration, dried, and redissolved in methylene chloride. The dried polymeric diimide was cross-linked by exposure to ultraviolet light for 200 sec using a Co-Light Co. 200 watt medium pressure mercury vapor exposure unit. This produced a cross linked polymeric diimide alignment layer on a flexible support 20 cm in width from which a small area would be utilized.

On top of the cross-linked polymeric alignment layer, a transparent indium-tin oxide conducting layer was prepared using a known technique of reactive sputtering of a metal target. A Leybold Heraeus GmbH device equipped with a HRC373 cathode was used to sputter Pure Tech. Inc. indium metal doped with 10 percent tin at ambient temperature, and an auxiliary discharge copper electrode (90 volts, 1.5 amp) placed in the reactive discharge region was used to improve the uniformity of the deposition. After evacuation of the chamber to $10^{-6}$ Torr, charging with 18% oxygen in argon to $10^{-2}$ Torr, the plasma was started (at 400 watts), and the substrate (the polymeric alignment layer on flexible support) was phased at a distance of 7.6 cm from the target at 76 cm/hour on a roller device. This produced an indinum tin-oxide conducting layer 0.2 micrometers thick of 50 ohms/square. The conducting layer was extended beyond the alignment layer to provide a means for electrical contact.

On top of the conducting layer a subbing layer of poly(acrylonitrile-co-vinylidene chloride-co-acrylic acid) (14:79:7 wt ratio) (0.54 g/m²) was coated from butanone.

On top of the subbed-conducting layer, a dye-receiving layer of the following polycarbonate derived from 4,4'-hexahydro-4,7-methanoindan-5-ylidene) bisphenol (Tg=260° C.) (2.9 g/m²) was coated from a methylene chloride and trichloro-ethylene solvent mixture:

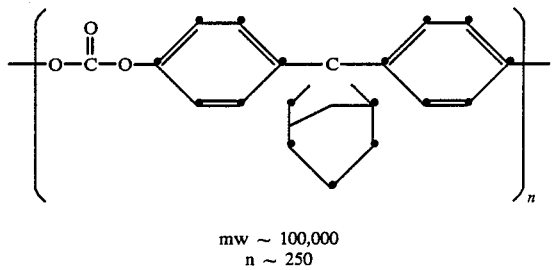

mw ~ 100,000
n ~ 250

A test pattern dye area of a magenta dye was transferred to the above composite from a dye-donor using a thermal head.

The dye-donor consisted of the following layers coated on a 6 μm poly(ethylene terephthalate) support:
 (1) Subbing layer of duPont Tyzor TBT ® titanium tetra-n-butoxide (0.16 g/m²) coated from a n-butyl alcohol and n-propyl-acetate solvent mixture, and
 (2) Dye layer containing the magenta dye illustrated above (0.15 g/m²) and FC-431 ® surfactant (3M Corp.) (0.002 g/m²), in a cellulose acetate-propionate (2.5% acetyl, 48% propionyl) binder (0.39 g/m²) coated from a cyclopentanone, toluene, and methanol solvent mixture.

A slipping layer was coated on the back side of the element similar to that disclosed in U.S. Pat. No. 4,829,050.

The dye side of the dye donor element strip was placed in contact with the dye receiving layer of the composite described above. The assemblage was clamped to a stepper motor driven 60 mm diameter rubber roller and a TDK Thermal Head L-231 (thermostatted at 26° C.) was pressed with a force of 36 Newtons against the dye-donor element side of the assemblage pushing it against the rubber roller.

The imaging electronics were activated causing the donor receiver assemblage to be drawn through the printing head/roller nip at 6.9 mm/sec. Coincidentally the resistive elements in the thermal print head were pulsed for 29 μsec/pulse at 128 μsec intervals during the 33 msec/dot printing time. A maximum density image was generated at 255 pulses/dot. The voltage supplied to the printing head was approximately 23.5 volts, resulting in an instantaneous peak power of 1.3 watts/dot and maximum total energy of 9.6 mJoules/dot.

The dye-receiving composite was separated from the dye-donor element. A dye area of area 1 cm×3 cm of an approximate density of 1.2 had been transferred. The composite with dye area was then passed through a Kodak SV65 Color Video Finisher to thermally stabilize the image.

The dye-receiving side of the composite was laminated to a 2.5 cm×7.5 cm piece of 1 mm thick borosilicate glass using a Kodak Kodabond 5116 ® hot melt adhesive sheet (25 μm thick) by passing through a Kodak Readyprint Photo Laminator ® at 176° C. This adhesive is described more fully in application Ser. No. 07/449,632 of our co-workers Harrison and Yacobucci, filed of even date herewith, and entitled "Glass-to-Polycarbonate Adhesive for Color Filter Array".

The flexible support was then peeled off exposing the alignment layer side of the composite with the test-pattern dye area.

A means for electrical contact to the conducting layer was provided by melting an indium metal bridge across the glass and that position of the conducting layer that extended beyond the alignment layer. This composite represented one-side (test-pattern dye side) of a liquid crystal display device.

For the second side of the liquid crystal display device, Nesatron ® (Corning Glass Co.), a commercially available conducting layer of indium tin oxide coated on glass was used.

The indium tin oxide conducting layer was about 0.2 microns thick having a resistivity of 40 ohms/square. A means for electrical contact to the conducting layer was again provided by melting an area of indium metal on that portion of the conducting layer on glass that extended beyond the liquid crystal cell. This composite represented the second-side (driver-side) of the liquid crystal display device.

Each coated side (alignment layer side of the test pattern-dye area composite and conducting layer side of the driver composite) were repeatedly rubbed firmly with a cotton swab in directions that would be mutually perpendicular upon assembly of the cell.

The area of the liquid crystal cell was created by placing the two composites together with glass support outward using a polyester spacer of poly(ethylene terephthalate) with walls 5 mm wide defining a rectangular opening 15 mm×20 mm. The spacer thickness (height) was 25 μm defining the electrode spacing distance between the two composites.

The test pattern dye area composite was warmed on a hot plate above the 64° C. clearing temperature of the liquid crystal, the polyester spacer was positioned, and a small drop (approximately 0.05 mL) of Licrystal LZI-1289 ® (Merck Co) was placed within the spacer. The edge of the other composite (driver electrode) was laid on the spacer, wetted with liquid crystal by contacting the small drop of liquid crystal, lowered onto the spacer, and excess liquid crystal was expelled by exerting light pressure. The assemblage was placed in a holder, clamped together, and allowed to cool to room temperature. When viewed between polarizing sheets, the cell rotated polarized light by 90°.

The cell was tested as follows. When a constant dc voltage was applied, the cell exhibited a threshold voltage of about 28 volts. Upon applying a voltage greater than the threshold voltage but less than about 40 volts, the liquid crystal partially aligned with the field, but relaxed within seconds to the twisted nematic configuration even though voltage was still applied. As the voltage was increased, the alignment was retained for longer periods of time, until at approximately 100 volts the alignment with the field was continuous. The light transmission through the cell increased with applied voltage reaching a maximum at about 100 volts. The approximate difference in transmission from threshold to 100 volts was 10% T to 47% T. This indicates the cell produced by this process has practical utility.

The invention has been described in detail with particular reference to preferred embodiments thereof, but it will be understood that variations and modifications can be effected within the spirit and scope of the invention.

What is claimed is:

1. A process of preparing a color filter array element for use in making a color liquid crystal display device comprising:
    (a) overlaying a dye receiving element with a dye-donor element, said dye-receiving element comprising a dimensionally-stable temporary support having thereon, in order, a polymeric alignment layer, a transparent conducting layer and a dye receiving layer;
    (b) imagewise heating said dye-donor element to transfer a dye image in a repeating mosaic pattern to said dye-receiving layer;
    (c) removing said dye donor element from contact with said dye receiving element;
    (d) laminating a transparent permanent support to said dye-receiving layer containing said dye image in a repeating mosaic pattern; and
    (e) removing said temporary support to expose one surface of said polymeric alignment layer, thereby forming said color filter array element.

2. The process of claim 1 wherein said temporary support is a polymeric material.

3. The process of claim 2 wherein said polymeric material is a polymeric diimide.

4. The process of claim 1 wherein said transparent conducting layer is indium tin oxide.

5. The process of claim 1 wherein said polymeric alignment layer is a polyimide.

6. The process of claim 1 wherein said permanent support is glass.

7. The process of claim 1 wherein said imagewise-heating is done by means of a laser using a dye-donor element comprising a support having thereon a dye layer and an absorbing material for the laser.

8. The process of claim 1 wherein said pattern consists of a set of red, green and blue additive primaries.

9. The process of claim 1 wherein each said primary color and each said set of primary colors are separated from each other by an opaque area.

10. The process of claim 9 wherein said opaque areas form a black grid.

* * * * *